Sept. 12, 1933. K. M. HAMILTON 1,926,233
HEAT DISTRIBUTING MEANS
Filed May 19, 1932

INVENTOR
Karl M. Hamilton
BY
Evans + McCoy
ATTORNEYS

Patented Sept. 12, 1933

1,926,233

UNITED STATES PATENT OFFICE.

1,926,233

HEAT DISTRIBUTING MEANS

Karl M. Hamilton, Chicago, Ill.

Application May 19, 1932. Serial No. 612,242

6 Claims. (Cl. 126—215)

This invention relates to heat distributors, and particularly to such devices for use with cooking utensils.

In the conventional gas stove there is a marked tendency, when relatively large utensils, such as skillets, are heated, toward a localized central heating thereof, with the result that the central portion of the utensil becomes much hotter than the peripheral portion. This, of course, is very objectionable since the material in the utensil cannot be uniformly cooked, even to the extent that by the time the material at the outer portion of the utensil is properly cooked, material at the center portion thereof may be overcooked or even burned.

It is one of the objects of the present invention to provide a new and improved means for use with cooking utensils for providing an even distribution of heat to the bottom surface of the utensil.

Another object is to provide a means for use with cooking utensils to deflect and distribute the heat of a flame over the peripheral area of the utensil.

A further object is to provide a heat distributing means for use with cooking utensils which is of such construction as to prevent localized concentration of heat at the bottom of the utensil.

With the above and other objects in view which will be apparent from the following detailed description, the present invention consists in certain features of construction and combinations of parts which will be readily apparent to those skilled in the art to which the invention appertains.

In the drawing which illustrates a suitable embodiment of the present invention, Figure 1 is a side elevation of the device, showing the same positioned above a gas burner and showing a cooking utensil mounted threon;

Figure 3:
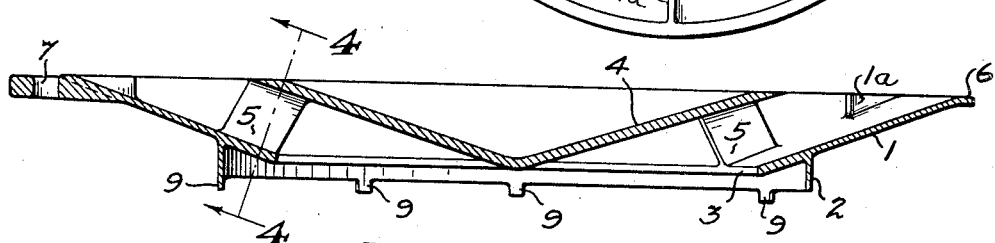
Fig. 3 is an enlarged section taken approximately on the line 3—3 of Fig. 2.

Referring to the accompanying drawing in which like numerals refer to like parts throughout the several views, the heat distributing means of the present invention comprises an inverted frusto-conical shell 1 having an axial circular flange 2 depending from the bottom surface thereof and arranged slightly outwardly from the smaller central opening 3 thereof but concentric therewith. The shell 1 supports an inverted conical deflecting member 4 through the medium of spaced vertical webs 5 which are integral with the conical member 4 and which space the same above the shell 1 with the apex of the member substantially at the lower smaller opening 3, as shown in Fig. 3.

The upper edge of the shell 1 is formed with an outwardly extending peripheral flange 6 enlarged and widened at one side and provided with an opening 7 therethrough so that the device may be hung, when not in use, from a nail or hook.

Figure 1:
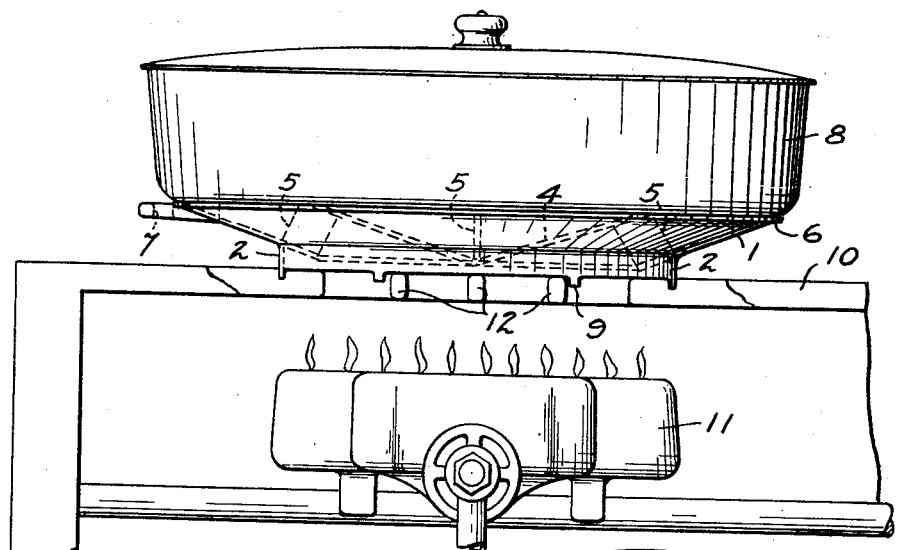
Figures 2, 4:
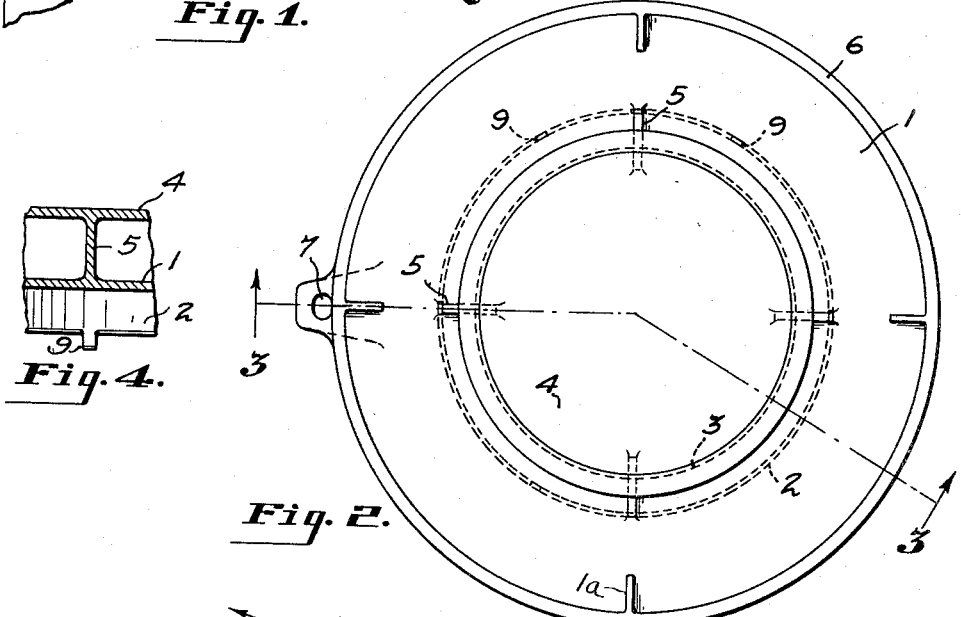
Fig. 2 is a plan view of the device shown in Fig. 1.
Fig. 4 is a section taken approximately on the line 4—4 of Fig. 3.

The circular edge of the conical member 4 lies substantially in the plane of the flange 6 and the surfaces of this edge and the flange 6 are preferably ground to provide a flat, uniform surface for supporting a utensil, such as a skillet 8, shown in Fig. 1. If desired, suitable upwardly extending ribs 1a may be formed at the inner surface of the shell 1 to assist in supporting the article which is carried by the device of the present invention.

Furthermore, the axial flange 2 is preferably formed with depending legs 9 so that when the device is supported on a grill 10 above a gas burner 11 these legs will depend between the bars 12 of the grill and prevent inadvertent displacement of the device on the grill, and also to serve as means for centering the device over the burner 11.

It is preferable that the heat distributing device be integrally cast from any suitable metal, although the shell 1 and conical deflection member 4 may be separately formed and then secured together by any suitable means, such as screws, which may be threaded into the spacing webs or ribs 5.

The depending axial flange 2 is of a diameter sufficiently large to lie outside of the periphery of the gas burner in order that the heat issuing from the burner flame will pass within the flange 2 and against the deflector 4.

The heat issuing to the space within the flange 2 and central opening 3 strikes the inverted conical member 4 to heat the same, and is then deflected outwardly to pass between the member 4 and shell 1 in a substantially endless ring of heat where it concentrates against the utensil supported thereon. Sufficient heat will radiate directly upwardly from the conical member 4 to heat the central portion of the utensil, and this, together with the heat concentrated over an endless area throughout the periphery of the utensil, serves to properly heat the bottom of the utensil, and thereby prevent localized heating thereof at the center.

Although not shown in the drawing, it may be desirable in some instances to form the inverted conical member 4 with a number of openings therein to permit the heat to flow directly to the bottom of the utensil supported by the device of the present invention. These openings may be of any size or shape, and may be of any number, depending, of course, upon the amount of heat that it is desired to have directed directly toward the central portion of the supported utensil.

The opening 7 at the one side of the flange 6, in addition to serving as a means for hanging the utensil on the hook, also provides a means whereby the heat distributing device may be lifted by means of a lid lifter when the device is hot, and cannot be removed by hand.

It is preferable, as shown in the drawing, to employ utensils which completely cover the annular opening at the upper side of the distributing device, so that all the available heat may be utilized, although slightly smaller diametered utensils may be used. With a device of the character described, a much smaller gas flame may be employed with a resultant saving in fuel, since it is possible to utilize all the available heat.

The advantages of saving in fuel, and even distribution of heat over the bottom of the utensil being heated can be readily appreciated.

Aside from the specific embodiments of the invention herein shown and described, it will be understood that numerous details of construction may be altered or omitted without departing from the spirit and scope of this invention, and it is not intended to limit the invention to the exact construction set forth, as it is desired to claim the invention broadly as well as specifically, as indicated in the appended claims.

What I claim is:

1. In a device of the character described, an inverted conical deflection member, an inverted frusto-conical shell circumscribing said deflection member, and means for spacing said deflection member from said shell, the upper edges of said shell and deflection member being substantially coplanar, for supporting a cooking utensil over the space therebetween said shell and deflection member being of substantially the same axial depth.

2. In a device of the character described, an inverted conical deflection member, an inverted frusto-conical shell circumscribing said deflection member, and means for spacing said deflection member from said shell, the upper edges of said shell and deflection member being substantially coplanar for supporting a cooking utensil over the space therebetween.

3. In a heat distributing device for cooking utensils, a central dished distributing member, an annular supporting member, the annulus thereof being dished and the radially inner edge thereof being overlapped with and spaced from said distributing member, and means supporting said distributing member on said supporting member, said supporting member having a peripheral edge for directly supporting a cooking utensil, said annular space serving to direct heat entering said supporting member against the bottom of the cooking utensil supported by said supporting member in an annular region, said distributing member extending substantially to the plane of said peripheral edge to substantially prevent the direct flow of heat from said annular space to the central portion of the bottom of the utensil directly supported by said peripheral edge of said supporting member.

4. A heat distributing device for cooking utensils, having a flat top upon which a cooking utensil may be supported and comprising an annular outer member of dished shape and having a central opening at the bottom thereof, and a dished heat distributing member of a diameter less than the outer diameter of said annular member and greater than the diameter of said opening, said heat distributing member being concentric with said outer member and having its apex projecting downwardly and its peripheral edge overlying and spaced above the edge of said opening, both dished members flaring from their bottom portions to the plane of said top and having marginal top edges providing utensil supporting surfaces.

5. In a heat distributing device for a cooking utensil, means for directing heat against the bottom of the utensil throughout an annular region, said means comprising an annular supporting member having a central opening at the bottom portion with a peripheral edge portion disposed in a plane above the opening and a body portion dished downwardly from said peripheral edge portion to said opening, a central dished heat distributing member substantially in the form of an inverted cone, the diameter of the upper portion of said distributing member being greater than the diameter of said opening, said heat distributing member being supported on said supporting member and spaced therefrom and having a marginal edge portion upon which the cooking utensil may be directly supported, whereby said heat distributing member will deflect the heat entering said opening away from the central portion of the bottom of the utensil and direct such heat in the form of an annular ring against the bottom of the utensil.

6. A heat distributing device for cooking utensils, having a flat top upon which a cooking utensil may be supported and comprising an outer member of dished shape and having a central opening at the bottom thereof, and an inverted conical heat distributing member of a diameter less than the outer diameter of said outer member and greater than the diameter of said opening, said heat distributing member being concentric with said outer member and having its apex projecting downwardly and its peripheral edge overlying and spaced above the edge of said opening, both members flaring from their bottom portions to the top and having the upper portions thereof providing utensil supporting surfaces.

KARL M. HAMILTON.